United States Patent [19]

Smith

[11] Patent Number: 4,655,632
[45] Date of Patent: Apr. 7, 1987

[54] ATTACHMENT APPARATUS FOR COLUMNAR MEMBER

[75] Inventor: Don E. Smith, Lufkin, Tex.

[73] Assignee: Texas Metal Casting Co., Inc., Lufkin, Tex.

[21] Appl. No.: 838,259

[22] Filed: Mar. 10, 1986

[51] Int. Cl.⁴ .......................... B25G 3/02; F16D 1/06
[52] U.S. Cl. .................................... 403/362; 403/366; 248/418; 297/349
[58] Field of Search ............... 403/366, 362, 361, 329; 248/418, 425; 108/150; 297/349

[56] References Cited

U.S. PATENT DOCUMENTS 2,472,307  6/1949  Nagel .............................. 403/366 X
3,501,182  3/1970  Buchsbaum ....................... 403/362
3,674,308  7/1972  Radding ........................ 248/425 X
4,224,786  9/1980  Lauglie ......................... 403/361 X Primary Examiner—Andrew V. Kundrat
Attorney, Agent, or Firm—Bill B. Berryhill

[57] ABSTRACT

Apparatus for removably attaching an item to a columnar member may include: a socket member for attachment to the item having a generally cylindrical interior terminating at a circular wall for receiving one end of the columnar member and a bushing member placeable over one end of the columnar member and receivable by the socket member to provide bearing and anti-galling surfaces between the socket member and the columnar member. A locking device may be carried by the socket member for engagement with the bushing member to apply radial forces to the bushing and columnar members to lock the item to the columnar member.

16 Claims, 4 Drawing Figures

ATTACHMENT APPARATUS FOR COLUMNAR MEMBER

BACKGROUND OF THE INVENTION

1. Field of the Invention

The present invention pertains to apparatus for removably attaching an item to a columnar member. More specifically, it pertains to apparatus suitable for removably attaching a boat seat to the upper end of a columnar member attached to the boat.

2. Description of the Prior Art

There are many types of boats in use—work boats, fishing boats, pleasure boats, etc. Most of these boats are provided with some sort of seating. Many of them are provided with individual seats which may or may not be adjustable in some fashion. Some of the seats, particularly those in pleasure boats are cushioned and made of materials which should not be left exposed to the elements. Thus, the seat may be removably attached to the boat so that it can be attached to the boat when in use and removed when not in use.

On a modern-day pleasure bow rider boat, a pedestal may be permanently attached to the floor of the boat with a columnar member extending upwardly therefrom. A seat may then be provided with a socket-like member which engages the upper end of the columnar member to support the seat. The socket-like member is sometimes referred to as a spider and is usually manufactured separately from the seat. It includes a flange-like attachment portion for attachment to the underneath side of the seat and a socket portion for receiving the upper end of the columnar member. Some type of locking device may be provided so that when the columnar member and socket portion are fully engaged the seat may be rotated on the column to the position desired and then locked in place. In most recent designs, some type of bushing may be provided in the socket to provide bearing and anti-galling surfaces between the socket and the columnar member.

SUMMARY OF THE INVENTION

The present invention provided apparatus for attaching a boat seat to the upper end of a columnar member and includes: a socket member for attachment to the under side of a boat seat; a bushing member insertable into the socket member for receiving the upper end of the columnar member; and a locking member carried by the socket member and engageable with bushing members for applying radial forces to the bushing and columnar members to lock the boat seat to the columnar member. The unique bushing member includes a tubular sleeve one end of which is open for receiving the upper end of the columnar member and at the opposite end of which is provided a circular wall against which the columnar member may bear when fully received by the bushing member. The tubular sleeve may be provided with a pair of longitudinal slits extending from the open end thereof substantially to the circular wall to provide a cantilevered section of the tubular sleeve supported near the circular wall and the free end of which is radially displaceable by the locking member to provide the necessary radial locking forces. The cantilevered sleeve section may also be provided on the exterior thereof with a projecting glove portion which may be engageable with a recessed area of the socket member to retain the bushing member within the socket member.

Although the apparatus of the present invention is primarily designed for removably attaching a boat seat to the upper end of a columnar member in a boat, it can be utilized for attaching other items to a columnar member. As will be apparent from reading the description which follows in conjunction with the accompanying drawings, the invention has many objects and advantages.

DESCRIPTION OF PREFERRED EMBODIMENTS

Figure 1:
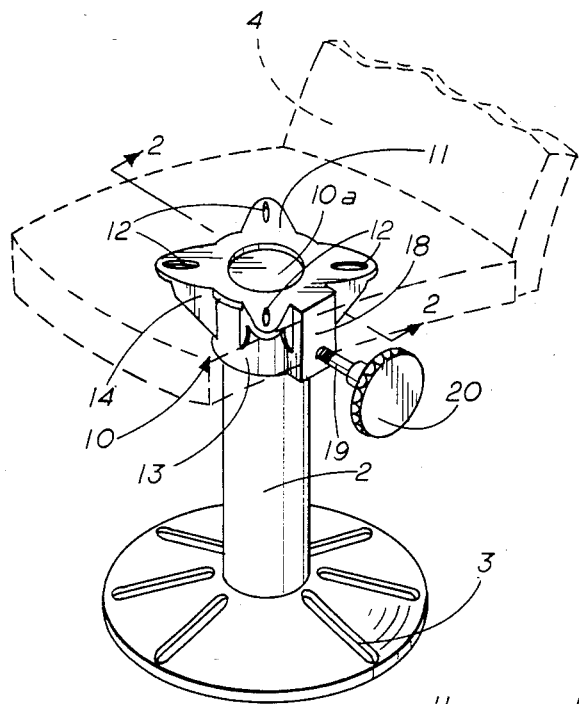
FIG. 1 is a perspective view of a pedestal and columnar member, such as might be attached to a boat, showing the apparatus of the present invention as it would be used to removably attach a boat seat, the boat seat being shown by dashed lines, to the upper end of the columnar member.

Referring first to FIG. 1, there is shown a circular pedestal 1 which might be attached to the floor of a boat by bolts, welding or any other suitable fastening method with a columnar member 2 extending upwardly therefrom. The pedestal 1 may be provided with reinforcing ribs 3 to strengthen the assembly. Actually, there are a number of pedestal designs, the one shown in FIG. 1 being for descriptive purposes only. Attached to the upper end of the column 2 is a boat seat 4.

Figure 2:
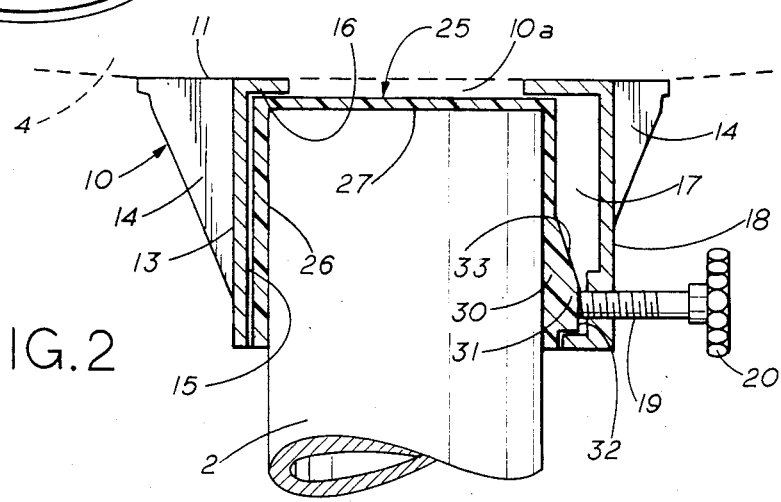
FIG. 2 is an elevation view, in partial section, showing the attachment apparatus of the present invention engaging the upper end of a columnar member such as the one shown in FIG. 1.

The boat seat 4 may be attached to the column 2 by apparatus which includes a socket or spider member 10 which is attached to the underneath side of the boat seat. The spider or socket 10 may include a flange portion 11 having apertures 12 therein through which screws or other types of fasteners may be passed for attachment to seat 4. Referring also to FIG. 2, the socket member 10 has a generally cylindrical body portion 13. Reinforcing ribs 14 may be provided between the body 13 and the flange 11 to strengthen the socket member 10.

The body 13 of the socket member 10 is provided with a cylindrical interior 15 for generally receiving the upper end of the column member 2. The cylindrical interior 15 terminates at a circular wall 16. A recessed area 17, outwardly closed by an embossed portion 18, of the socket member 10 may also be provided, the purpose of which will be more fully understood hereafter. The embossed portion 18 may also be threaded to receive a threaded locking member 19 which may also include a knob 20 for manual rotation thereof.

Figure 3:
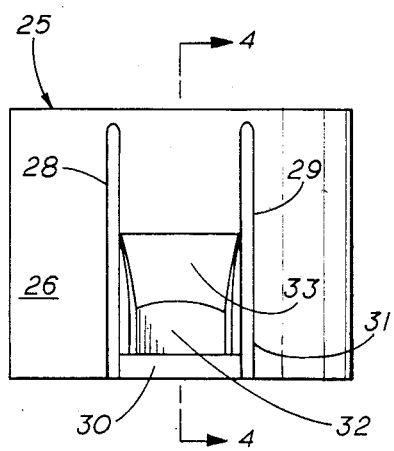
FIG. 3 is an elevation view of a bushing member according to a preferred embodiment of the invention, such as the one shown in FIG. 2 but rotated ninety degrees.
Figure 4:
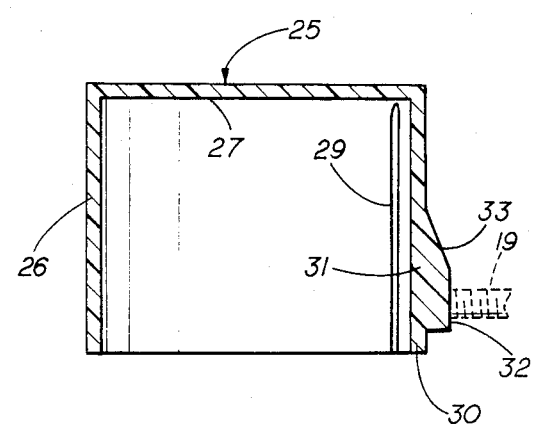
FIG. 4 is a sectional view of the bushing member of FIG. 3 taken along line 4—4 thereof.

Insertable into the interior of the socket member 10 for receiving the upper end of the column member 2 is a bushing member 25, best understood with reference to FIGS. 3 and 4. The bushing member 25 comprises a tubular sleeve 26, one end of which is open to receive the upper end of the columnar member 2 and the opposite end of which is provided with a circular wall 27 against which the upper end of the columnar member bears when fully received by the bushing member 25.

One of the primary purposes of the bushing member 25 is to provide bearing and anti-galling surfaces between the socket member 10 and the columnar member 2.

The tubular sleeve 26 has a pair of longitudinal slits 28, 29 extending from the open end thereof substantially to the circular wall 27 to provide a cantilevered or flap section 30 supported near the circular wall 27 and the free end of which is radially displaceable upon application of radial forces such as might be applied thereto by the threaded lock member 19. Near the free end of the cantilevered tubular sleeve section 30 may be provided a projecting lug 31 providing an engagement surface 32 for engagement by the threaded member 19. Since the bushing 25 is preferably made of a relatively resilient material, DELRIN, ABS Plastic, NYLON, TEFLON, or other suitable materials may be used.

The bushing 25 is initially insertable into the socket member 10, prior to the columnar member 2 being received thereby, by simply pushing the bushing 25 into the cylindrical interior of the socket member 10 by an axial force such as the hand. As this is done, a cam-like surface 33 on the lug 31 forces the cantilevered sleeve section 30 inwardly until the lug 31 engages the recessed area 17, thus retaining the bushing member within the socket member 10. With the bushing 25 properly located in the socket 10, and the locking member 19 sufficiently disengaged or outwardly displaced, the bushing 25, the socket member 10 and the seat 4 attached thereby may be placed on the upper end of a columnar member 2, the end of column 2 being fully received therein until the upper end of the column 2 engages circular wall 16. The seat 4 and socket member 10 may be then rotated to the desired rotational position, at which time the locking member 19 may be rotated by the knob 20 placing an inwardly directed radial force on the cantilevered sleeve section 30 by engagement with the surface 32 of the lug 31. As the locking member 19 is brought to bear against the lug 31, the cantilevered section or flap 30 is radially displaced against the column 2 applying radial forces to the bushing member 25 so that it frictionally engages the column 2 to lock the socket member 10 and the seat 4 attached thereto to the column 2.

To remove the seat 4 from the column 2, the locking member 19 is simply rotated in the opposite direction removing the radial forces against the lug 31, allowing the cantilevered section 30 to assume its natural state and leaving enough clearance between the columnar member 2 and the socket member 10 so that the seat 4, socket member 10 and bushing 25 may be removed as a unit from the column 2. If it is desired to remove the bushing member 25 from the socket 10, the locking member 19 may be rotated and fed inwardly to radially displace the free end of the cantilevered sleeve section 30 until the lug portion 31 is totally displaced from the recessed area 17 of the socket member 10. Then the bushing member 25 may be removed by simply pushing it out of the socket member 10 through the hole 10a.

Although the apparatus of the present invention has been described primarily for removably attaching a boat seat to the upper end of a columnar member, it can be used for removably attaching most any kind of item to a columnar member. Furthermore, although a single embodiment of the invention has been described herein, many variations can be made without departing from the spirit of the invention. Accordingly, it is intended that the scope of the invention be limited only by the claims which follow.

I claim:

1. Apparatus for removably attaching an item to a columnar member comprising:
    socket means for attachment to said item having a generally cylindrical interior terminating at a circular wall for receiving one end of said columnar member;
    bushing means placeable over said one end of said columnar member and receivable by said socket means to provide bearing and anti-galling surfaces between said socket means and said columnar member; and
    locking means carried by said socket means engageable with said bushing means for applying radial forces to said bushing means and said columnar member to lock said item to said columnar member;
    said bushing means comprising a tubular sleeve one end of which is open for receiving said one end of said columnar member and at the opposite end of which is provided a circular wall against which said one end of said columnar member bears when fully received by said bushing means, said tubular sleeve having a pair of longitudinal slits extending from said open end thereof substantially to said circular wall to provide a cantilevered section of said tubular sleeve supported near said circular wall and the free end of which is radially displaceable by said locking means upon application of said radial forces thereby.

2. Apparatus as set forth in claim 1 in which said free end of said cantilevered tubular sleeve section is provided with lug means on the outer surface thereof for engagement by said locking means.

3. Apparatus as set forth in claim 2 in which said locking means comprises a threaded member threadedly engaging a hole through said socket means for radial engagement with said lug means upon rotation of said threaded member.

4. Apparatus as set forth in claim 3 in which the outer end of said threaded member is provided with a knob for manual rotation thereof.

5. Apparatus as set forth in claim 2 in which the interior of said socket means is provided with a recessed area engageable by said lug means upon insertion of said bushing means into said socket means for retaining said bushing means in said socket means.

6. Apparatus as set forth in claim 5 in which said free end of said cantilevered section may be radially and inwardly displaced, when said columnar member is not received by said socket member, to allow disengagement of said lug means from said recessed area and removal of said bushing means from said socket means.

7. Apparatus as set forth in claim 1 in which said bushing means is made of relatively resilient material.

8. Apparatus for removably attaching a boat seat to the upper end of a columnar member attached to a boat comprising:
    socket means for attachment to the underside of said seat and having a generally cylindrical interior;
    bushing means insertable into said socket means for receiving said upper end of said columnar member to provide bearing and anti-galling surface between said socket means and said columnar member; and
    locking means carried by said socket means engageable with said bushing means for applying radial forces to said bushing means and said columnar member to lock said boat seat to said columnar member;

said bushing means comprising a tubular sleeve one end of which is open for receiving said upper end of said columnar member and at the opposite end of which is provided a circular wall against which said upper end of said columnar member bears when fully received by said bushing means, said tubular sleeve having a pair of longitudinal slits extending from said open end thereof substantially to said circular wall to provide a cantilevered section of said tubular sleeve supported near said circular wall and the free end of which is radially displaceable by said locking means upon application of said radial forces.

9. Apparatus as set forth in claim 8 including retainer means on said bushing means engageable with a portion of said socket means to hold said bushing means in said socket means, said retainer means being disengageable from said socket means, when said columnar member is not received by said socket means to allow removal of said bushing means.

10. Apparatus as set forth in claim 9 in which said retainer means comprises lug means on the outer surface of said bushing means engageable with a recessed area of said socket means for said holding of said bushing means in said socket means, said lug means being radially and inwardly displaceable, when said columnar member is not received in said socket means, for said displacement and removal therefrom.

11. Apparatus as set forth in claim 10 in which said lug means is located on said free end of said cantilevered sleeve section.

12. Apparatus as set forth in claim 8 in which said locking means comprises a threaded member threadedly engaging said socket means and engageable with said free end of said cantilevered sleeve section for applying said radial forces thereto.

13. Apparatus as set forth in claim 12 in which said free end of said cantilevered sleeve section is provided on the exterior thereof with projecting lug means providing an engagement surface for said engagement by said threaded member.

14. Apparatus as set forth in claim 13 in which said socket means includes a recessed area engageable with said lug means to retain said bushing means within said socket means, said lug means being radially displaceable from said recessed area, when said columnar member is not received in said bushing member, to allow removal of said bushing member from said socket means.

15. Apparatus as set forth in claim 8 including retainer means on said bushing means engageable with a portion of said socket means to prevent unwanted displacement of said bushing means from said socket means.

16. Apparatus as set forth in claim 15 in which said retainer means comprises lug means on the exterior of said cantilevered sleeve section near said free end thereof engageable with a recessed area of said socket means to prevent said displacement of said bushing means, said lug means being radially displaceable with said free end of said cantilevered sleeve section when said columnar member is not received by said bushing to allow removal of said bushing means from said socket means.

* * * * *